UNITED STATES PATENT OFFICE.

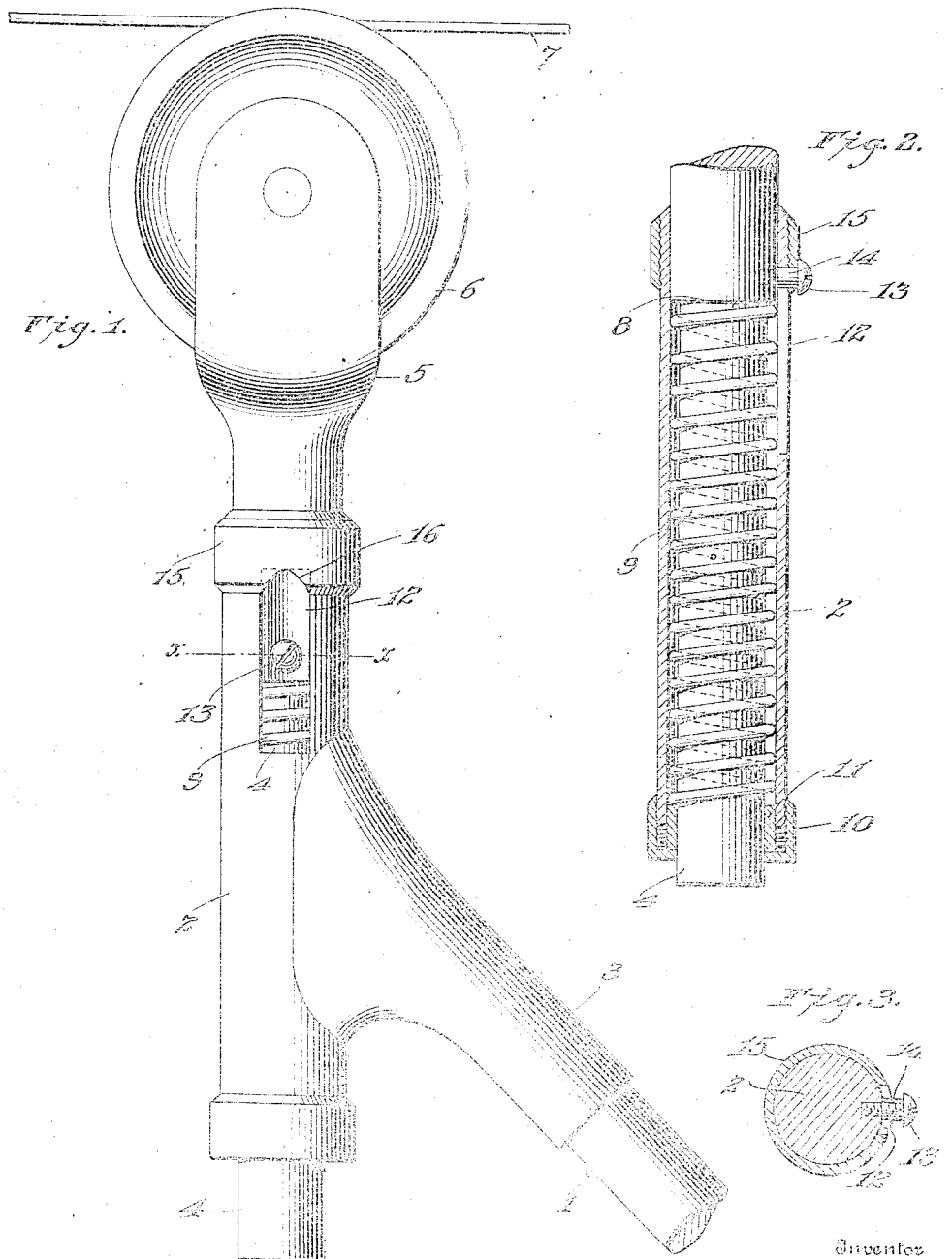

CHARLES BAKER, OF PHILADELPHIA, PENNSYLVANIA.

TROLLEY.

No. 921,661.   Specification of Letters Patent.   Patented May 18, 1909.

Application filed October 15, 1908. Serial No. 457,769.

*To all whom it may concern:*

Be it known that I, CHARLES BAKER, a citizen of the United States, residing at Philadelphia, in the county of Philadelphia and State of Pennsylvania, have invented certain new and useful Improvements in Trolleys, of which the following is a specification.

My invention relates to improvements in trolleys, and more particularly to an improved mounting for the trolley harp on the trolley pole, the object of the invention being to so mount the harp with relation to the pole that the harp will be elastically supported, and capable of a predetermined rotary motion, to permit the wheel to follow the irregularities in the trolley wire, and so construct and assemble the other parts, that this mounting of the harp will be an extremely sensitive one, and prevent a great deal of annoyance caused by the wheels jumping from the wire as is the case with the ordinary construction of trolley in use.

A further object is to provide an improved elastic mounting of the trolley harp, which is capable of adjustment to regulate the pressure of the wheel against the trolley wire, and which is so constructed that while the wheel is allowed a certain lateral movement, it will be automatically centered to a position in alinement with the trolley pole should the wheel escape from the wire, and thus render the replacing of the wheel upon the wire an easy matter.

A further object is to provide improvements of this character of extremely simple inexpensive construction, and so construct and support the parts upon which the greatest wear will come, that such parts can be replaced when worn, and not require the substitution of an entirely new device.

With these and other objects in view the invention consists in certain novel features of construction, combinations and arrangements of parts as will be more fully hereinafter described and pointed out in the claims.

In the accompanying drawings Figure 1, is a view in side elevation illustrating my improvements in operative position. Fig. 2, is a view in longitudinal section through the vertical tube 2, and Fig. 3, is a view in section on line x—x of Fig. 1.

1 represents a trolley pole and 2 a sleeve or tube, located at an acute angle with relation to pole 1, and connected to said pole by a tubular extension 3. This tube 2 and its extension 3 may be made in a great many ways. One construction being an ordinary bicycle tubing, although I do not limit myself to the particular construction of this tube or frame. The tube 2 when in operative position is substantially vertical, and is adapted to receive therein the extended plunger portion 4 of the harp 5, which latter carries the ordinary trolley wheel 6 in engagement with wire 7. The plunger 4 is reduced in diameter throughout the greater portion of its length forming a shoulder 8, as clearly shown in Fig. 2, and a coiled spring 9 is disposed around the plunger 4 and bears at its upper end against shoulder 8, to exert upward pressure on the harp and trolley wheel. The lower end of the tube 2 is closed by a ring or nut 10 screwed on to the lower end of the tube and having a central opening through which the plunger 4 projects. A collar 11 is located in the lower end of tube 2 and against the nut or ring 10, and the lower end of the spring 9 bears against this collar 11, and it will be observed that by adjusting the nut or ring 10, or by the insertion of a larger or smaller collar 11 in the end of the tube 2, the tension of the spring can be adjusted to suit all conditions. A longitudinal slot 12 is provided in the upper portion of tube 2, and a screw 13 is screwed into the larger upper portion of the harp plunger, and carries a sleeve 14 thereon, which latter is capable of rotary motion on the screw, and adapted, when the screw is moved into contact with the walls of the slot, to reduce friction and consequent wear.

A wearing ring 15 is internally screw threaded, and screwed upon the upper end of tube 2. This ring preferably overlaps a portion of the slot 12 and is made with a curved notch or recess 16 in its lower edge, the walls of said notch or recess merging into the walls of the slot 12, so that when the trolley wheel escapes from the wire, the upward pressure of the spring 9 on the harp, will force the screw 13 into the notch 16 in ring 15, and thus center the screw in said curved notch so that the wheel 6 will be held in alinement with the trolley pole and can be readily returned to the trolley wire. Thus by constructing the ring 15 with the notch 16, the greatest wear will come upon this ring and it can be readily replaced with but slight expense when unduly worn.

Fig. 1 represents the normal position of the parts in operation. It will be seen that when in such position, the plunger portion of the harp will be moved down into the tube 2, against the pressure of spring 9, so that the screw 13 will be located about midway the ends of the slot 12. When in such position the trolley wheel will be permitted a certain amount of lateral movement, or rather the harp will be permitted a certain amount of rotary movement with relation to the trolley pole, to compensate for irregularities in the wire 7, but the principal advantage attained is that the wheel 6 will be elastically held against the wire and the connection be an extremely sensitive one, quick to conform to the irregularities of the wire and to prevent the wheel jumping from the wire. A great deal of annoyance, as is well known, is caused by the wheels jumping from the wire, which is due in a large part, to the fact that springs which hold the wheel against the wire are located on top of the car and a considerable distance from the wheel, hence any sudden irregularity, or a too great speed on the part of the car will cause the wheel to jump from the wire as the elastic connection of the pole is so far away, and the connection of the wheel and wire is not sufficiently sensitive to compensate for anything out of the ordinary slow operation.

With my improvement, while I do not intend to dispense with the springs for supporting the trolley pole, I am enabled to employ springs of much lighter tension than heretofore required. Such powerful springs will not be necessary, as the connection at the wire will be so sensitive that the main springs on the car will not be called upon to perform all the duties of holding the wheel in contact with the wire.

A great many changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a device of the character described, the combination with a trolley pole, a tube secured at an angle to the free end of said pole and having an elongated slot therein, a harp, a trolley wheel carried by the harp, an elongated plunger on said harp located in the said tube, a ring or nut screwed on the lower end of the tube, a collar inside the tube and around the plunger, a spring around the plunger bearing at its upper end against the plunger, and at its lower end against the collar, a screw in said plunger located in the slotted portion of the tube, a wearing ring secured on the upper end of the tube and having a curved notch in its lower edge registering with the side walls of the slot in said tube to center the screw, when the plunger is moved upward by the spring.

2. In a device of the character described, the combination with a trolley pole, a tube secured at an angle to the free end of said pole and having an elongated slot therein, a harp, a trolley wheel carried by said harp, an elongated plunger on said harp extending through the said tube, a device fixed on said plunger located in the slot and limiting the rotary movement of the harp, an annular shoulder on said plunger in the tube, said tube screw threaded at its lower end, an adjusting nut or ring screwed on to the lower end of said tube, and located around the plunger, and a coiled spring around said plunger in the tube and between the annular shoulder on the plunger and said ring or nut.

In testimony whereof I have signed my name to this specification in the presence of two subscribing witnesses.

CHARLES BAKER.

Witnesses:
R. H. KRENKEL,
J. A. L. MULHALL.